United States Patent
Meier et al.

[11] Patent Number: 6,057,660
[45] Date of Patent: May 2, 2000

[54] DEVICE FOR DETERMINING THE STATE OF A WIPER BLADE

[75] Inventors: Hans Meier, Ottersweier; Guenther Riehl, Buehlertal; Henry Blitzke, Buehl, all of Germany

[73] Assignee: Robert Bosch GmbH, Stuttgart, Germany

[21] Appl. No.: 09/171,024

[22] PCT Filed: Mar. 21, 1997

[86] PCT No.: PCT/DE97/00584

§ 371 Date: Mar. 3, 1999

§ 102(e) Date: Mar. 3, 1999

[87] PCT Pub. No.: WO97/37877

PCT Pub. Date: Oct. 16, 1997

[30] Foreign Application Priority Data

Apr. 10, 1996 [DE] Germany .......................... 196 14 100

[51] Int. Cl.[7] .................................................. B60S 1/08
[52] U.S. Cl. .................... 318/483; 318/444; 318/DIG. 2; 15/250 C
[58] Field of Search .................................... 318/480–483, 318/440–448, DIG. 2; 15/250.001, 250.48, DIG. 15

[56] References Cited

U.S. PATENT DOCUMENTS

| 4,689,536 | 8/1987 | Iyoda | 318/483 |
| 4,916,374 | 4/1990 | Schierbeek et al. | 318/483 |
| 5,140,234 | 8/1992 | Wallrafen | 318/264 |
| 5,252,898 | 10/1993 | Nolting et al. | 318/444 |
| 5,453,670 | 9/1995 | Schaefer | 318/444 |
| 5,508,595 | 4/1996 | Schaefer | 318/444 |
| 5,654,617 | 8/1997 | Mills | 318/444 |
| 5,694,012 | 12/1997 | Pientka et al. | 318/444 |
| 5,729,105 | 3/1998 | Droge | 318/483 |
| 5,760,559 | 6/1998 | Pientka et al. | 318/483 |

*Primary Examiner*—Paul Ip
*Attorney, Agent, or Firm*—Kenyon & Kenyon

[57] ABSTRACT

A device which determines a condition of at least one wiper blade of a motor-vehicle windshield wiper. The device includes a rain sensor controlling the motor-vehicle windshield wiper and being utilized for determining the condition of the wiper blade. The device also includes an evaluation circuit receiving data from the rain sensor. The evaluation circuit evaluates wear and tear of a rubber wiper element of the wiper blade based on one of a slow and continuous change of the data and a quick and continuous change of the data provided by the rain sensor.

7 Claims, 1 Drawing Sheet

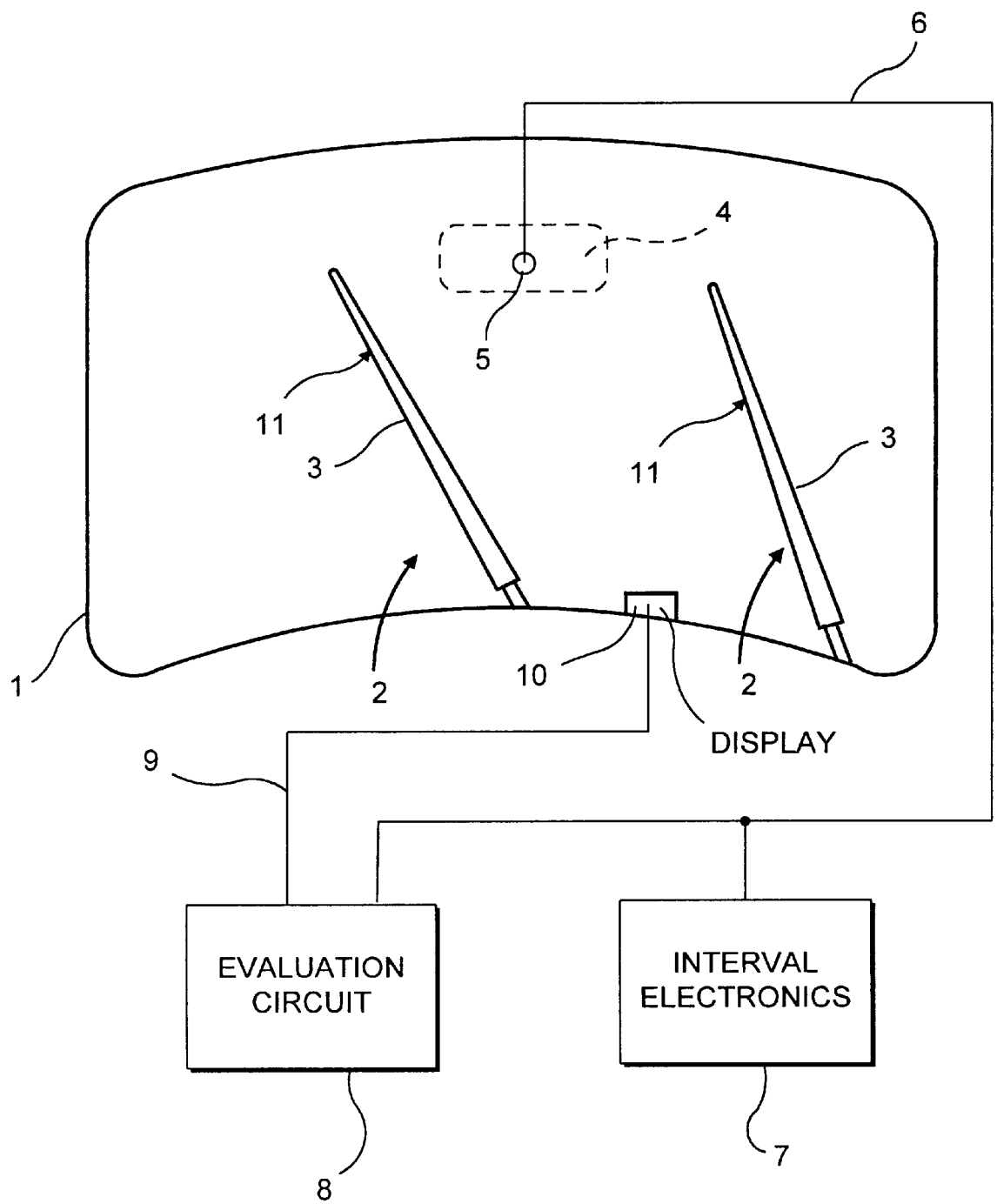

DEVICE FOR DETERMINING THE STATE OF A WIPER BLADE

BACKGROUND INFORMATION

The present invention relates to a device for ascertaining the condition of at least one wiper blade of a motor vehicle.

For safety reasons, motor-vehicle wiper blades must be cleaned or replaced regularly. Dirty wiper blades lead to inadequate wiping results, so that visibility is affected. The same holds true for rubber wiper elements (otherwise referred to as "blade rubbers") which have worn out or have become too old. Different influence variables have an affect on the wiping result and limit the service life of wiper blades, it thus being very difficult for the motor-vehicle driver to determine with sufficient accuracy the point of time to change the wiper blade.

German Published Patent Application No. 36 39 831 describes a known device according to which the condition of a wiper blade is determined. In doing this, the wear and tear of a wiper strip is monitored by an optical moisture sensor, with which the windshield to be cleaned is scanned before and after a wiping operation. With these means, the quality of the wiping field is objectively judged, and information is obtained about the wear and tear of the viper strip. This moisture sensor is accommodated in a scanning device, preferably similar to a plotter, by which the windshield to be cleaned is scanned in the individual areas. Thus, this corresponds to a mobile test apparatus, and is used merely to detect the condition of a wiper blade.

The device of the present invention for ascertaining the condition of at least one wiper blade of a motor vehicle provides for using a rain sensor which is already at hand for determining the time to replace the wiper blade or to clean it. Therefore, a component, namely the rain sensor, is not only used normally for detecting a rain event and thus for controlling the windshield wiper delay control, but according to the present invention, is used for ascertaining the condition of the wiper blades. Thus, in the present invention, the rain sensor is given a double function. For example, the rain sensor is located in the area of the rear-view mirror at the windshield, and there detects the state of the window surface with respect to precipitation. According to the present invention, the rain sensor is also able to detect the condition of the windshield with respect to possible dirt, deposits, etc., whereby a conclusion is possible about the condition of the wiper blade, namely concerning its dirtiness, or concerning the wear or ageing of the wiper blades, that is to say, of the rubber wiper elements.

As already mentioned, the rain sensor is preferably arranged at the vehicle window having the wiper blade.

According to a further development of the present invention, the rain sensor is arranged within the area of the vehicle window swept over by the wiper blade. This ensures that the rain sensor can directly detect the wiping result of the wiper blade.

It is advantageous if the device has an evaluation circuit which evaluates the data from the rain sensor. This evaluation circuit is used to evaluate the data coming from the rain sensor as to the condition of the wiper blade, and to trigger an appropriate reaction when certain limiting values are exceeded. Preferably, the evaluation circuit carries out a statistical evaluation of the data supplied by the rain sensor.

The evaluation by the evaluation circuit is carried out in particular with regard to dirtiness of the wiper blade and/or dirtiness of the rain sensor, and/or wear and tear or overageing of the rubber wiper element. To this end, it is determined whether the acquired data changes slowly and continuously, which indicates wear of the rubber wiper element. If the data changes relatively quickly and continually, the wiper blade is dirty. If certain data are ascertained which do not correspond to a perfect condition of the system, this suggests that the rain sensor is dirty, this ascertained dirtiness being constant in most cases, thus scarcely subject to a change. By appropriate evaluation, particularly along statistical lines, the individual conditions of the wiper blade can be ascertained with sufficient accuracy.

Preferably, a signal is emitted when a specific characteristic condition of the rubber wiper element has been detected. For example, the signal can be effected optically and/or acoustically; in particular, it is advantageous to provide a display which, by variable activation, e.g. blinking or sustained light, calls upon the driver to change the wiper blade, or to clean the rain sensor and/or the rubber wiper element.

BRIEF DESCRIPTION OF THE DRAWING

The FIGURE shows a schematic representation of a vehicle windshield with two windshield wipers, as well as a rain sensor and associated electronics.

DETAILED DESCRIPTION

The Figure shows a vehicle window 1 which forms a windshield of a motor vehicle, and to which are allocated two windshield wipers 2 that have wiper blades 3, as well as rubber wiper elements 11 mounted on the wiper blades; the arrangement of one windshield wiper 2 is also possible. Arranged in the area of rear-view mirror 4, indicated with a broken line, is a rain sensor 5 that is connected via an electric line 6 to an interval electronics 7. However, it is also possible to arrange rain sensor 5 at a different location of the windshield; it is only important that rain sensor 5 be arranged in an area which is swept over by the windshield wiper or wipers 2. This interval electronics 7 is located, for example, in the engine compartment. Interval electronics 7 represents the usual device of a vehicle equipped with rain sensor 5, i.e., if rain sensor 5 detects precipitation, interval electronics 7 drives windshield wipers 2 in the rhythm of the intensity of the precipitation event.

According to the present invention, rain sensor 5 is connected via line 6 to a further electronic, namely, an evaluation circuit 8, the data coming from rain sensor 5 being evaluated by the evaluation circuit 8 with regard to recognizing the condition of wiper blades 3 and/or of rain sensor 5. To that end, evaluation circuit 8 has suitable data fields, characteristics fields or the like, so that the data coming from rain sensor 5 is preferably evaluated under statistical boundary conditions. In this manner, the rain sensor 5, actually provided for a different purpose, is used to detect the state of wear and tear or dirtiness of the wiper blades 3 or of the rubber wiper elements 11, and at the same time, rain sensor 5 monitors itself, i.e., the dirtiness of rain sensor 5 is likewise detected by evaluation circuit 8. Evaluation circuit 8 is connected via a line 9 to a display 10 which informs the vehicle driver, e.g. by blinking or by a sustained light, that a certain state of the wiper blades 3 exists, or the rain sensor 5 is dirty, so that the driver can take the appropriate step at the correct time.

All in all, the present invention assures that an optimally cleaning motor-vehicle wiping system is always present.

What is claimed is:

1. A device for determining a condition of at least one wiper blade of a motor-vehicle windshield wiper, comprising:
   a rain sensor utilized for controlling the motor-vehicle windshield wiper and for determining the condition of the at least one wiper blade.

2. The device according to claim 1, wherein the rain sensor is arranged at a vehicle window which has the at least one wiper blade.

3. The device according to claim 2, wherein the rain sensor is arranged within an area of the vehicle window which is swept over by the at least one wiper blade.

4. The device according to claim 1, wherein the evaluation circuit performs a statistical evaluation of the data provided by the rain sensor.

5. The device according to claim 4, wherein the statistical evaluation is performed with respect to at least one of a dirtiness of the at least one wiper blade, a dirtiness of the rain sensor, the wear of the rubber wiper element of the at least one wiper blade, and an over-aging of the rubber wiper element.

6. The device according to claim 1, further comprising a signal output for outputting a signal representing the condition of the at least one wiper blade.

7. The device according to claim 1, further comprising:
   an evaluation circuit receiving data from the rain sensor and determining the condition of the at least one wiper blade as a function of the data.

* * * * *

UNITED STATES PATENT AND TRADEMARK OFFICE
CERTIFICATE OF CORRECTION

PATENT NO. : 6,057,660
DATED : May 2, 2000
INVENTOR(S) : Hans Meier, Guenther Riehl and Henry Blitzke It is certified that error appears in the above-identified patent and that said Letters Patent is hereby corrected as shown below:

Column 1,
Line 25, change "viper," to -- wiper --.

Column 3,
Line 9, after "wiper blade," insert -- ; and an evalutation circuit receiving data from the rain sensor, the evaluation circuit evaluating an amount of a wear of a rubber wiper element of the at least one wiper blade on one of a slow and continuous change of the data and a quick and continuous change of the data provided by the rain sensor --.

Signed and Sealed this

Fourth Day of December, 2001

*Attest:*

*Nicholas P. Godici*

*Attesting Officer*

NICHOLAS P. GODICI
*Acting Director of the United States Patent and Trademark Office*